United States Patent [19]

Richter et al.

[11] Patent Number: 5,065,835

[45] Date of Patent: Nov. 19, 1991

[54] MOTOR VEHICLE WITH WHEELS DRIVEN VIA DIFFERENTIAL GEARING OR THE LIKE

[75] Inventors: Karl-Heinz Richter, Kernen; Gerhard Rollmann, Tamm; Helmut Struck, Winnenden; Gerd Eilert, Schwaikheim, all of Fed. Rep. of Germany

[73] Assignee: Daimler-Benz AG, Fed. Rep. of Germany

[21] Appl. No.: 435,995

[22] Filed: Nov. 14, 1989

[30] Foreign Application Priority Data

Nov. 26, 1988 [DE] Fed. Rep. of Germany ....... 3840004

[51] Int. Cl.$^5$ ............................................. B60K 28/16
[52] U.S. Cl. ..................................... 180/197; 180/249
[58] Field of Search ......................... 180/197, 248, 249

[56] References Cited

U.S. PATENT DOCUMENTS

| 4,681,185 | 7/1987 | Hoernig et al. | 180/247 |
| 4,704,541 | 11/1987 | Leiber | 180/197 |
| 4,781,265 | 11/1988 | Weiler et al. | 180/197 |
| 4,809,807 | 3/1989 | Leiber | 180/197 |

FOREIGN PATENT DOCUMENTS

| 3225459 | 5/1986 | Fed. Rep. of Germany . |
| 3527959 | 2/1987 | Fed. Rep. of Germany . |
| 3545544 | 10/1987 | Fed. Rep. of Germany . |
| 3721662 | 5/1988 | Fed. Rep. of Germany . |

Primary Examiner—Charles A. Marmor
Assistant Examiner—Mitchell Bompey
Attorney, Agent, or Firm—Evenson, Wands, Edwards, Lenahan & McKeown

[57] ABSTRACT

A motor vehicle with four driving wheels and driven differential gearing for the drive, where (in the case of rotational-speed differences occurring between the wheels) a control device intervenes to distribute the drive power of an engine to the permanently driven wheels and/or the other driven wheels. This intervention occurs for a particular holding time which is progressively extended if a new intervention by the control becomes necessary after a test disconnection of the respective intervention. In addition, or alternatively, the control device can respond more sensitively and thus more quickly to rotational-speed differences of the wheels which may later occur during, or after, a test disconnection.

18 Claims, 1 Drawing Sheet

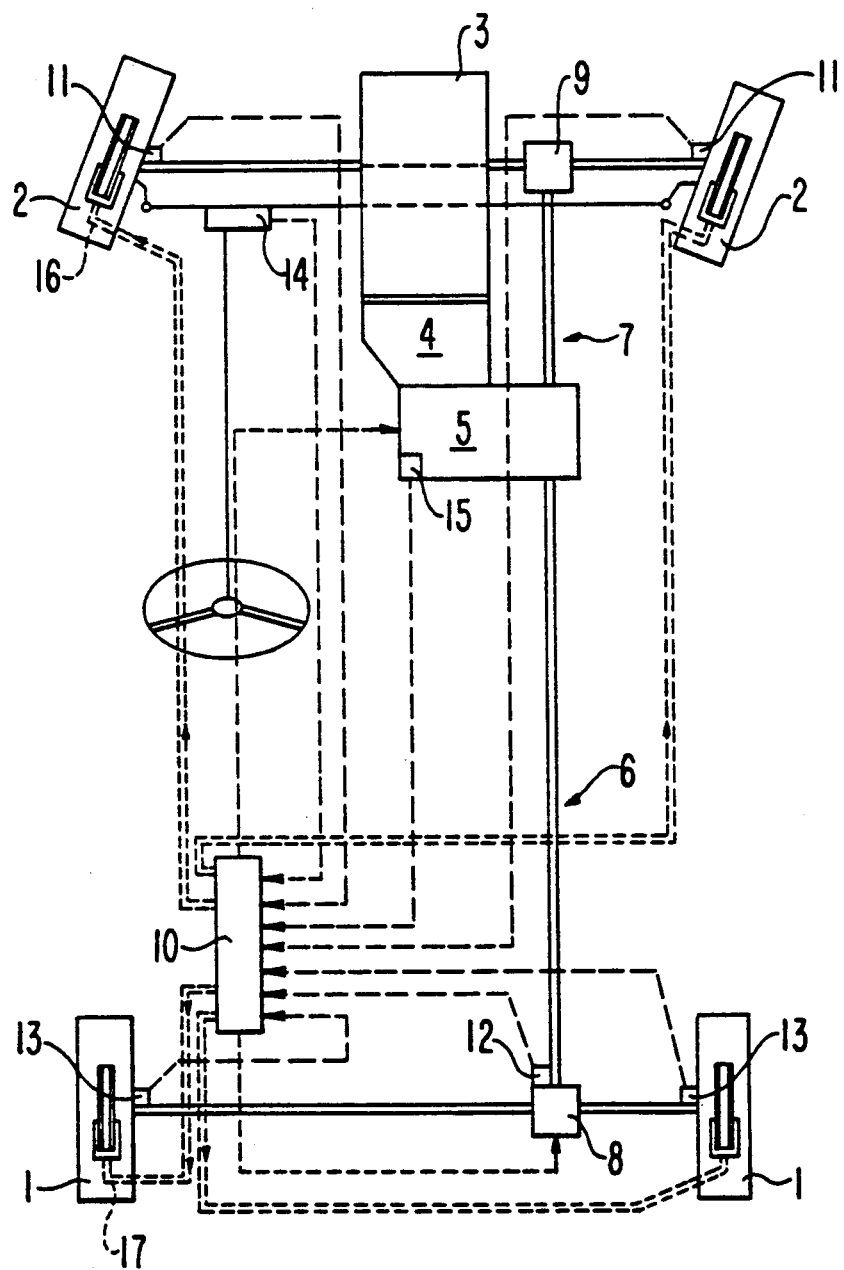

MOTOR VEHICLE WITH WHEELS DRIVEN VIA DIFFERENTIAL GEARING OR THE LIKE

BACKGROUND AND SUMMARY OF THE INVENTION

The invention relates to a motor vehicle with all wheels driven via differential gearing or the like, wherein a control device samples the rotational speed of the wheels via sensors and which—in order to achieve synchronism between driving wheels, actuates locks associated with the differential gearing for predeterminable holding times when rotational-speed differences of the wheels exceed threshold values which are permanently predetermined or predetermined in dependence on the driving condition. The control can actuate the locks of the differential gearing, or differential gears, or individual brakes associated with the driving wheels, and/or a clutch arrangement connecting the connectable all-wheel drive to the drive shafting of the vehicle to control the speed of the driven wheels.

In addition to vehicles with permanent all-wheel drive, there are vehicles in which the all-wheel drive is manually or automatically connected.

For automatic connection, viscous clutches are often used in which the torque transmitted depends on the differences in rotational speed between the clutch input and output. When the rotational-speed difference is exceeded, the amount of transferable torque rises steeply. This makes it possible for the vehicle to behave like a rear wheel-driven (or also front-wheel-driven) vehicle when driving on a non-slip base. The all-wheel drive only becomes effective under difficult driving conditions.

However, it is disadvantageous if the all-wheel drive becomes effective with a permanently predetermined difference in rotational speed between front and rear wheels and accordingly it is impossible to take into consideration special driving conditions.

For this reason, there are automatically connectable all-wheel drives which are operated by means of a control device which is responsive to rotational wheel speeds sensors and to other parameters such as, for example, steering angles or the like. This basically provides an opportunity for controlling the all-wheel drive in an extremely flexible manner. For example, the all-wheel drive can only be connected within a limited speed range and when the vehicle is allowed to drive exclusively in a predetermined driving mode (e.g. with rear-wheel drive or with front-wheel drive at relatively high speeds). It is also possible to connect the all-wheel drive at different driving speeds only after different threshold values for the rotational-speed differences between front and/or rear wheels are exceeded. As a result, the manageability of the vehicle can be considerably improved in boundary situations.

In principle, the same applies to differential locks, for example those which lock a central differential between front axle and rear axle in an all-wheel drive, or the differential of a driving axle in vehicles having only one driven axle or all wheel drive. Although locks can be basically constructed as viscous clutches, arrangements in which the locks or their locking degree are controlled by means of a control device in dependence on the rotational wheel speeds (or the differences of the rotational wheel speeds) are superior with respect to the possible variability of the control system.

In the case of vehicles having only one driven axle, instead of providing a differential lock, one can separately control wheel brakes in dependence on the rotational wheel speeds (or on differences between the rotational wheel speeds) by means of the control device in order to brake a driving wheel which is spinning and thus rotating very quickly compared with the remaining vehicle wheels. As a result, an increased torque is automatically transmitted via the differential to the other driving wheel so that a desired synchronism of the driving wheels can be produced.

In all systems in which the wheel brakes, and/or the differential locks, and/or the clutch arrangement controlling the connectable all-wheel drive, are actuated by means of a control device, it is advantageous if the sensors, necessary for controlling the rotational wheel speeds, already exist. Because vehicles equipped with such elaborate driving systems usually also have a service brake with an anti-blocking system, the necessary sensors are available without adding them. For others, control devices with computer support can also be used for other tasks when there is adequate computer capacity in such vehicles.

It is then an object of the invention to further develop a motor vehicle of the above general type in such a manner that a particularly good adaptation to respective driving conditions is rendered possible.

According to the invention, this object is achieved by having the control device actuate the lock or locks, the brake or brakes, and/or the clutch device after partial or complete disengagement of the latter (test disconnection) in dependence on a variable time interval. The time interval elapses after the partial or complete disengagement to a new occurrence of the threshold value for progressively increased holding times, and/or during a predeterminable time interval, even when a reduced threshold value or reduced threshold values occur.

The invention is based on the general finding that especially difficult roadway conditions (slippery) must be present if a new intervention becomes necessary, immediately after an intervention of the control device in the distribution of the drive power to the permanent, or connectable drive wheels. In order to be able to perform a sensitive control, the respective intervention can initially occur during a very brief holding time which is then followed by a test disconnection. That is to say, the previously actuated lock, brake and/or clutch arrangement are disengaged and subsequently actuated for an increased holding time if the rotational wheel speeds (or differences of these), which occur during the test disconnection, exceed predeterminable threshold values. Due to the fact that the holding time is increasingly extended up to a maximum value, one avoids possible excitation of oscillations which are unwanted in the drive shafting.

Additionally or alternatively, the response sensitivity of the control device is increased after an intervention of the latter so that, under certain circumstances, there is no complete test disconnection of the brake, lock and/or clutch arrangement which was in each case previously actuated. Instead the latter are already actuated when rotational speed differences between the wheels of the vehicle are beginning or are still relatively slight.

In the case of an automatically connected all-wheel drive, the drive wheels are thus not even completely disconnected from the drive shafting during a test disconnection. Instead, under certain circumstances, only a reduced torque is transmitted to the connected driving wheels during the test disconnection. This makes it possible to prevent the continuously driven driving wheel(s) from slipping excessively during the test disconnection and the traction power of the vehicle dropping to a comparative extent.

A differential lock operating with force locking can be controlled in the same manner. If rotational-speed differences, (which exceed a previously reduced threshold value) occur at the driving wheels associated with the respective differential, even with partial detachment of the differential lock (i.e. with reduced force locking) the differential lock is again controlled to become fully effective. In this case there is no complete test disconnection.

Even if the synchronism of driving wheels is achieved by separate actuation of the wheel brakes, it is possible to reactuate an actuated wheel brake more strongly after only partial reduction of the braking force and when a previously reduced threshold value of a rotational-speed difference of the driving wheels is already reached or exceeded during the partial detachment of the said wheel brake. This ensures that the driving wheel which is rotating more slowly in each case is continuously supplied with a certain driving torque.

In a particularly preferred embodiment of the invention, the length of the time interval (in which the control device responds to reduced threshold values) depends on the frequency or the succession in time of the threshold-value transgressions. As a result, the brakes or locks or clutch devices respond in a particularly sensitive manner without significant delay in slippery driving conditions.

It is also possible that the control device continuously checks which rotational accelerations or decelerations of the vehicle wheels occur and continuously updates corresponding measurement values and stores these for a predetermined period of time. As long as no relatively large rotational-speed differences between the vehicle wheels have occurred in the rotational accelerations or decelerations registered, the registered rotational acceleration or deceleration represents a measure of the minimum coefficient of friction existing on the respective roadway. If a relatively large rotational-speed difference between the different wheels has occurred on acceleration of the vehicle, or if the anti-blocking system has responded during braking of the vehicle, the rotational accelerations or decelerations of the wheels, represent a measure of the top limit of the coefficient of friction of the respective roadway. If then, the control device changes the threshold values of the rotational-speed differences (occurring between the vehicle wheels at which the control device intervenes in the distribution of the drive power to the permanent or connectable drive wheels) analogously to the magnitude of the rotational accelerations or decelerations of the wheels occurring, the drive system can be matched to the coefficients of friction of the respective roadway. This is true since the control system already intervenes in the distribution of the drive power to the permanent or connectable driving wheels with relatively low rotational-speed differences between the vehicle wheels on a slippery base.

In a further advantageous development of the invention, it is preferable to change the threshold values in dependence on speed and in dependence on the steering angle, the threshold values being reduced with increasing value of the product of speed and steering angle. This results in the control device intervening early in the distribution of the drive power to the permanently driven or connectable driving wheels in tight curves, for example when driving through mountain passes. This prevents sudden or abrupt increased driving torques becoming effective at the driving wheels which rotate more slowly during the intervention of the control device in the distribution of the driving power.

This has the following significance: when driving in curves, a driving wheel can spin particularly during acceleration. This is equivalent to the spinning driving wheel losing its ground adherence and thus also its cornering force while the slowly rotating driving wheel still works with ground adherence and correspondingly existing cornering force. Preventing a driving torque from being suddenly (abruptly) applied to the slowly rotating driving wheel, effectively prevents the slowly rotating driving wheel from also losing its ground adherence or cornering force due to the intervention of the control device in the distribution of the driving power.

In a particularly preferred embodiment of the invention, rotational-speed differences between front and rear wheels as well as rotational-speed differences between the wheels of opposite vehicle sides are registered. It is thus possible, when driving quickly in curves, to control the distribution of the drive power to the permanently driven or connectable driving wheels primarily in dependence on rotational-speed differences between the wheels of opposite vehicle sides. This is done by increasing threshold values for the permissible rotational-speed differences with increasing driving speed and increasing steering angles in order to take into account different track radii and rotating speeds of the wheels when driving in curves.

To avoid a change in the driving characteristics which may surprise the driver in certain circumstances, for example the transition from understeering to oversteering behavior, it may be suitable if the control device opens any rear-axle differential lock which may have been actuated (and/or the lock of the central differential between front and rear axle) only when the steering has reached its straight-ahead position or an adjoining position.

To facilitate the starting on a slippery base, the control device can leave the beginning position of the locks, brakes and/or clutch arrangements, which have been switched to be effective during a starting attempt, within a predeterminable time interval during the previous starting attempt. This provides that during the subsequent starting attempt, the system does not wait until rotational-speed differences occur between the wheels of the vehicle and, instead, a synchronism of the driving wheels is immediately obtained so that starting can occur with the least-possible slippage.

Other objects, advantages and novel features of the present invention will become apparent from the following detailed description of the invention when considered in conjunction with the accompanying drawings.

BRIEF DESCRIPTION OF THE DRAWING

The single FIGURE shows a diagrammatic top view of a vehicle with an interconnected all-wheel drive.

DETAILED DESCRIPTION OF THE DRAWING

As a rule, the vehicle normally runs with a rear-wheel drive, that is to say with driven rear wheels 1. The drive to the front wheels 2 is only connected under special conditions.

The engine 3 is drive-connected via a conventional manual or automatic transmission 4 to a divider transmission 5 which is drive-connected via a main drive shafting 6 to the rear wheels 1 and connectable via an auxiliary drive shafting 7 to the front wheels 2. In this arrangement, the drive power in the main drive shafting 6 is transmitted to the rear wheels via a rear-axle differential 8 which is provided with a lock.

In the auxiliary drive shafting 7, a front-axle differential 9 is arranged between the steerable front wheels 2 which normally cannot be locked to ensure good steerability of the vehicle.

The divider transmission 5 has a clutch arrangement by means of which the auxiliary drive shafting 7 can be completely decoupled from the engine 3. In this decoupled operating condition, the main drive shafting 6 is directly drive-connected to the engine 3 or the transmission 4.

As soon as the auxiliary drive shafting 7 is connected, main drive shafting 6 and auxiliary drive shafting 7 are drive-connected to the two outputs of a central differential arranged as part of the divider transmission 5, the input of which is connected to the transmission 4 or to the engine 3, respectively. The central differential is associated with a differential lock so that synchronism between main drive shafting 6 and auxiliary drive shafting 7 is forced in the locked condition.

The clutch arrangement associated with the divider transmission 5 and the lock of the central differential of the divider transmission 5 and the lock of the rear-axle differential 8 are automatically actuated by a control device 10. The input of the control device 10 is connected to various sensors. In this arrangement, sensors 11 register the rotational speed of the front wheels 2. A sensor 12 registers the rotational speed of the main drive shafting 6. If necessary, sensors 13 which register the rotational speeds of the associated rear wheels 1 can also be utilized instead of the sensor 12. Furthermore, sensors 14 and 15 are provided for the steering angle of the front wheels 2 and the speed of the vehicle, respectively. Sensors 16 and 17 can be provided for providing braking signals from the respective front wheel(s) 2 and rear wheel(s) 1 to the control device 10 when the brake is actuated.

Sensors 11 can be used for checking the extent to which the front wheels 2 rotate with different speed. Sensors 11 and 12 can be used for checking the extent to which the mean rotational speeds of the front wheels 2 or the rotational speed of a single front wheel 2 deviate from the mean rotational speed of the rear wheels 1. A corresponding check can also be performed by means of the sensors 11 and 13. Sensors 13 additionally provide the possibility of detecting rotational-speed differences between the rear wheels 1.

In dependence on rotational-speed differences occurring between wheels, in dependence on the speed of the vehicle determined by means of the sensor 15, and in dependence on the steering angle sampled by means of the sensor 14, the control device 10 can select between four possibilities of distributing the drive power of the engine 3 to the wheels 1 and 2:

In a normal case (stage 0), only the rear wheels 1 are driven and the lock of the rear-axle differential 8 remains open.

Furthermore, a balanced all-wheel drive (stage 1) is possible in which all wheels 1 and 2 are driven and both the lock of the central differential 5 and the lock of the rear-axle differential 8 remain open.

In addition, an all-wheel drive with a switched-on lock of the central differential 5 is possible (stage 2), the lock of the rear-axle differential 8 remaining open.

Finally, the vehicle can be driven with all-wheel drive and locked central and rear-axle differentials (stage 3).

The various stages are switched on and off in dependence on different criteria, in which arrangement the higher stages, particularly stages 2 and 3 cannot be switched on at higher vehicle driving speeds. For the rest, the system basically switches back to stage 0 when the vehicle brake is operated. For this purpose, the control device 10 receives a braking signal when the brake is operated.

At very low vehicle driving speeds the vehicle continuously runs in stage 1, as a rule.

When travelling, the control device 10 continuously checks the rotational speeds of the front and rear wheels 1 and 2, the system changing to the respectively higher stage when threshold values are reached for rotational-speed differences between the wheels 1 and/or 2. This stage remains switched on for a certain holding time after which a test disconnection occurs. If then rotational-speed differences occur again, the higher stage is again switched on. If necessary, the system can also change to the stage above.

To ensure an operating mode of the vehicle which is particularly matched to the respective circumstances, the control progressively extends the holding times if the criterion for a higher stage is again reached during a test disconnection, or within a predeterminable time interval after a test disconnection. In addition, or alternatively, it is provided to lower the threshold values for a next higher stage after, or during, a test disconnection for a predetermined period of time so that the control device 10 responds more sensitively and thus more quickly to rotational-speed differences which may have occurred during or after, a test disconnection.

Special conditions can be taken into consideration by the control to provide the desired stage.

During travelling operation, rotational-speed differences (which are not based on differential slip of the wheels) can occur between the wheels. Such rotational-speed differences are mainly based on different air pressures in the tires, that is on different rolling circumferences of the wheels. In order to provide for sensitively controlling the threshold values for the actuation of the locks or brakes, it is desirable to be able to take into consideration such rotational-speed differences. In this connection, the differential speed effect can be utilized to provide a constant quotient between the rotational speeds of these wheels because of the different rolling circumferences of two wheels during slipless straight-ahead driving, independently of the speed and/or acceleration of the vehicle. Since the rotational wheel speeds are in any case continuously monitored by sensors for an anti-blocking system of the service brake, these signals are available without additional expenditure.

As soon as the steering assumes its straight-ahead position indicated by the steering angle sensor, the system checks (during driving conditions without actuation of the brakes or locks) to what extent rotational-speed conditions of the wheels remain unchanged during speed changes of the vehicle. This checking is effected mainly during low speeds and with relatively low accelerations of the vehicle.

A subsequent intervention of the control device in the distribution of the drive power to the driving wheels can occur very sensitively when there are deviations from the previously determined rotational-speed quotient ratio. Thus, the control device is "calibrated" for detecting a particular rotational-speed ratio as a normal condition.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A motor vehicle having wheels driven via differential gearing, sensors for detecting wheel rotational-speed, and means for forcedly achieving synchronism between the wheels, said means being automatically actuated for predeterminable holding periods when rotational-speed differences exceed predeterminable threshold values and configured for repeated actuation when new occurrences of the predetermined threshold values of the rotational-speed differences are detected, wherein said repeated actuations automatically take place in one of two states comprising successively extended holding periods and on occurrence of successively lowered threshold values if time intervals between occurrences of said threshold values and respectively preceding actuations of said synchronism means decrease as a first state, and on occurrences of successively lowered threshold values if time intervals between occurrences of said threshold values and respectively preceding actuations of said synchronism means decrease as a second state.

2. The motor vehicle according to claim 1, wherein the length of the time intervals depends on successively occurring threshold value changes.

3. The motor vehicle according to claim 1, wherein the means determines values of rotational accelerations and decelerations of the vehicle wheels;
   stores there determined values for a predeterminable time period; and
   increases or decreases relative rotational-speed threshold values in response to the stored values of the accelerations or decelerations at low vehicle driving speeds.

4. The motor vehicle according to claim 2, wherein the means determines values of rotational accelerations and decelerations of the vehicle wheels;
   stores these determined values for a predeterminable time period; and
   increases or decreases relative rotational-speed threshold values in response to the stored values of the accelerations or decelerations at low vehicle driving speeds.

5. The motor vehicle according to claim 1, wherein at lower vehicle speeds, a relative rotational-speed threshold value for a maximum permissible rotational-speed difference between a front and a rear wheel is changed inversely proportionally to a product of a respective steering angle of the vehicle and driving speed of the vehicle.

6. The motor vehicle according to claim 2, wherein at lower vehicle speeds, a relative rotational-speed threshold value for a maximum permissible rotational-speed difference between a front and a rear wheel is changed inversely proportionally to a product of a respective steering angle of the vehicle and driving speed of the vehicle.

7. The motor vehicle according to claim 1, wherein when driving in a curve with increasing driving speed and increasing steering angles, the means is operatively configured to provide for an increased relative rotational-speed threshold value for rotational speed differences between steering wheels on opposite sides of the vehicle.

8. The motor vehicle according to claim 2, wherein when driving in a curve with increasing driving speed and increasing steering angels, the means is operatively configured to provide for an increased relative rotational-speed threshold value for rotational speed differences between steering wheels on opposite sides of the vehicle.

9. The motor vehicle according to claim 3, wherein when driving in a curve with increasing driving speed and increasing steering angles, the means is operatively configured to provide for an increased relative rotational-speed threshold value for rotational speed differences between steering wheels on opposite sides of the vehicle.

10. The motor vehicle according to claim 1, wherein after an actuation of the means to reduce speed differences while the vehicle is turning, a repeated action to reduce relative speed only occurs when vehicle steering reaches or is close to a straight-ahead position.

11. The motor vehicle according to claim 2, wherein after an actuation of the means to reduce speed differences while the vehicle is turning, a repeated action to reduce relative speed only occurs when vehicle steering reaches or is close to a straight-ahead position.

12. The motor vehicle according to claim 1, wherein during all-wheel drive, a differential lock associated with a rear wheel axle of the vehicle is switched on in response to rotational-speed differences of the front wheels.

13. The motor vehicle according to claim 2, wherein during all-wheel drive, a differential lock associated with a rear wheel axle of the vehicle is switched on in response to rotational-speed differences of the front wheels.

14. The motor vehicle according to claim 1, wherein during successive starting attempts of the vehicle that follow within a predeterminable time interval, the means is operatively configured to store information as to actuated status of the respective locks, gears, brakes, clutch during a preceding starting attempt and they remain effective for the next start for the predeterminable time interval and to extend that time interval.

15. The motor vehicle according to claim 1, wherein said means controls actuation of either a rear-axle differential lock or rear wheel brakes for achieving synchronism between the speeds of the rear wheels in dependence on steering angle and on the driving speed.

16. The motor vehicle according to claim 2, wherein said means controls actuation of each a lock of a rear-axle differential locks or rear wheel brakes for achieving synchronism between the speeds of the rear wheels in dependence on steering angle and on the driving speed.

17. The motor vehicle according to claim 1, wherein the means samples rotational wheel speeds during straight-ahead driving and one of unactuated brakes and differential locks and checks the relative wheel speeds within a predetermined speed or acceleration range, and the means is configured so that no subsequent actuation by the means will occur as long as the relative rotational-speed conditions remain constant.

18. The motor vehicle according to claim 2, wherein the means samples rotational wheel speeds during straight-ahead driving and one of unactuated brakes or differential locks and checks the relative wheel speeds within a predetermined speed or acceleration range, and the means is configured so that no subsequent actuation by the means will occur as long as the relative rotational-speed conditions remain constant.

* * * * *